United States Patent [19]

Edgerton et al.

[11] 4,305,805
[45] Dec. 15, 1981

[54] SILVER RECOVERY APPARATUS

[76] Inventors: Ronald E. Edgerton, 5807 Chestwood Rd., Matteson, Ill. 60443; John F. Miscik, R.R. 3, Box 419, North Judson, Ind. 46366; Leon L. Rondeau, 723 Shawnee Dr., Lowell, Ind. 46356

[21] Appl. No.: 180,876

[22] Filed: Aug. 25, 1980

[51] Int. Cl.³ .......................... C21D 21/12; C25C 7/00
[52] U.S. Cl. ..................................... 204/229; 204/275
[58] Field of Search ....................... 204/109, 228–229, 204/237, 275

[56] References Cited

U.S. PATENT DOCUMENTS

| | | | |
|---|---|---|---|
| 3,418,225 | 12/1968 | Wick et al. | 204/109 |
| 3,715,291 | 2/1973 | Bentley | 204/229 X |
| 3,936,363 | 2/1976 | Fessenden | 204/109 X |
| 3,964,990 | 6/1976 | Woyden | 204/275 |
| 4,069,127 | 1/1978 | Salemi et al. | 204/229 |
| 4,166,781 | 9/1979 | Staples | 204/275 X |

FOREIGN PATENT DOCUMENTS

| | | | |
|---|---|---|---|
| 2045883 | 3/1972 | Fed. Rep. of Germany | 204/275 |
| 1445960 | 8/1976 | United Kingdom | 204/275 |

*Primary Examiner*—Delbert E. Gantz
*Assistant Examiner*—Donald R. Valentine
*Attorney, Agent, or Firm*—Walter Leuca

[57] ABSTRACT

This invention is a combination of a silver recovery apparatus, a silver solution source, and a holding tank. The solution accumulates in the holding tank to a given quantity. Then this quantity is reached, a switch activated by a float member operates a valve device in a pipe or conduit connecting the tank and the silver recovery apparatus, allowing flow of the solution from the holding tank to the silver recovery apparatus. A flow metering valve is also provided in the conduit from the holding tank to the silver recovery apparatus to control the rate of flow therethrough. The switch activated by the float member also operates the silver recovery apparatus. Therefore when there is sufficient silver solution in the holding tank, the silver recovery apparatus is put in operation and silver is recovered from the solution under optimum quantity and quality control. When there is insufficient silver solution in the holding tank due to reduction of solution supply from the source, the switch device responding to the lowering of the level of solution in the tank, will close the valve device in the conduit to stop the flow of solution from the holding tank to the silver recovery apparatus and will shut off the silver recovery apparatus, thereby preventing wasting of silver.

5 Claims, 2 Drawing Figures

SILVER RECOVERY APPARATUS

BACKGROUND OF THE INVENTION

1. Field of the Invention

This invention relates generally to the art of metal recovery and more particularly to a method and means of recovering silver from the developing process of photographic film.

2. Description of the Prior Art

The most efficient and practical method of recovering silver from spent silver solution containing silver such as from film developing solution is by means of the electroplating method which is accomplished by use of commercially available silver recovery units. These units are supplied with a flow of solution from, for example, the fixer overflow section of a film developer. Such silver recovery units are commercially available and operate on the silver plating principle. Such units generally contain for its silver recovery means, anode and cathode members submerged in a bath of solution containing silver through which an electric current is charged whereby silver is deposited onto the cathode from the solution and from which, from time to time, the silver plated on the cathode is removed therefrom. The particular problem of the prior art that this invention is intended to alleviate is the problem commonly associated with prior art method and means used to recover silver from the process of developing X-ray film in hospital operations. Hospital practice generally expose and develop a majority of its X-ray film during the morning hours. Consequently, the film developing equipment and the silver recovery equipment which operate in conjunction therewith generally are not in operation during the evening or night hours. If the operating attendant does not put in operation the silver recovery equipment at the same time that the film developing equipment is put in operation, the silver laden solution is wasted down the drain. Also, since the prior art method includes the step of providing the silver recovery unit with silver laden fixer solution directly from the film processing unit, the silver laden solution will contain varying concentration of silver. Since the silver recovery unit operates on a preselect current, this preselect current may be insufficient or excessive for the amount of silver in the solution at the moment of flow therethrough. If the current is insufficient for the silver concentration flowing through the unit, silver recovery will be incomplete and silver will be wasted in that all of it will not be precipitated onto the cathode. On the other hand, if there is insufficient silver in the solution for the current which is preset on the silver recovery unit, the current will burn the silver and diminish its value. Another variable inherent in the prior art process of recovering silver by the electroplating method is the rate of flow of the silver laden solution. If a large quantity of film is required to be processed within a limited time, the rate of flow is increased which results in silver being lost even though the current is adequate for the silver solution concentration since this has the same effect as when the current is insufficient.

These variables which are inherent in the prior art method of recovering silver, that is: (1) irregular concentration of silver in the fixer overflow solution resulting from irregular film processing, (2) irregular flow of silver laden solution from the processor to the silver recovery unit resulting from direct feeding of the solution, and, (3) due to human error, failure to operate the film processing unit and the silver recovery unit at the same time, all contribute to wasting of silver metal.

SUMMARY OF THE INVENTION

Accordingly we have invented a method and means whereby the film developing processing unit and the silver recovery unit of the prior art are operationally interconnected to prevent wasting of silver. Also, the silver laden solution from the processing unit is accumulated in a holding tank interposed between the units so that the flow to the silver recovery unit may be controlled for maximum silver recovery of the highest quality given the electric current preset on the silver recovery unit.

We accomplish this by providing a holding tank to receive the silver laden solution from a source such as, for example, a film developing processor. The silver laden solution accumulates in the holding tank to a given quantity. When this quantity is reached, a switch activated by a float member operates a valve device allowing flow of the silver laden solution from the holding tank through a flow metering valve which regulates the rate of flow of the solution therethrough to the silver recovery unit. The circuit of the switch also includes the power circuit to the silver recovery unit so that the operation of the valve device allowing flow from the holding tank automatically initiates operation of the silver recovery unit when sufficient solution accumulates in the tank to cause closing of the float activated switch. According to the teaching of our invention, a given operating current set on the silver recovery unit and a given silver concentration in the solution, will require a rate of flow which is controlled by presetting a metering valve. The holding tank serves to accumulate the silver laden solution from which a more consistent supply of solution having a more uniform or homogeneous concentration of silver may be made available. Our invention thereby correlates the variables inherent in the prior art method and means of recovering silver, more closely so that optimum silver recovery at a given current setting of the unit is more consistently accomplished.

Other objects and advantages will become more apparent after a study of the following detailed description of our invention which is to be read with reference to the accompanying drawings wherein is illustrated a preferred embodiment thereof.

DETAILED DESCRIPTION OF THE INVENTION

Figure 1:
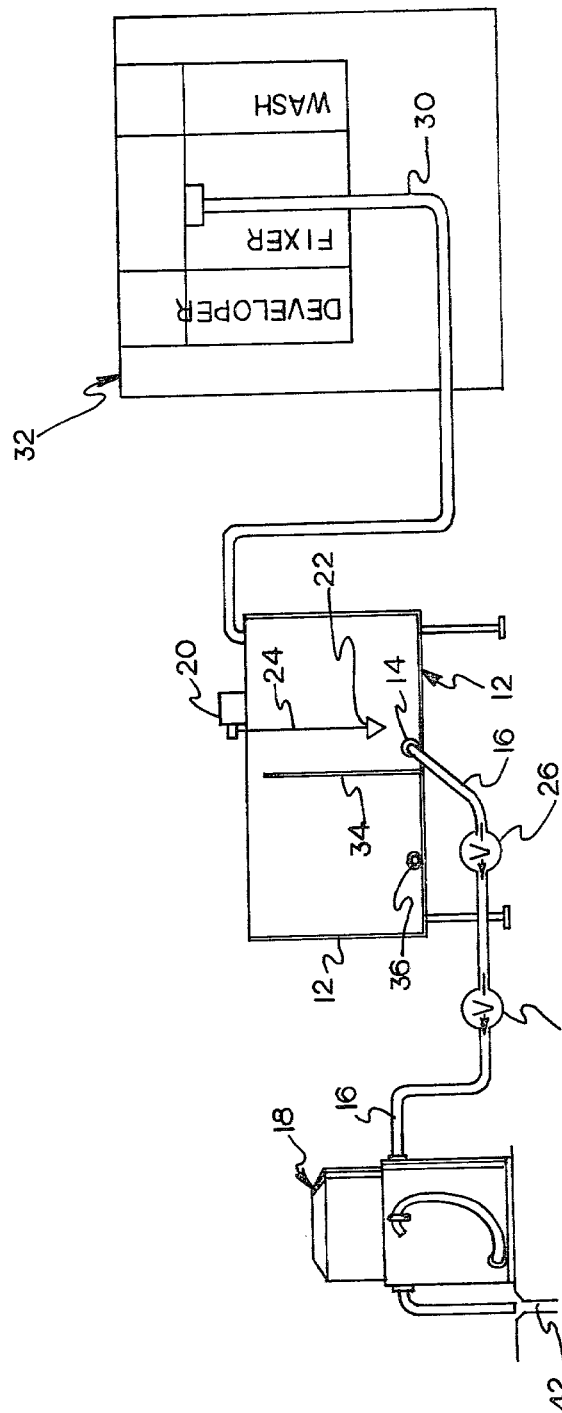
FIG. 1 is a side elevation of the combination of our invention.

Referring now more particularly to the drawings, numeral 10 designates generally a preferred embodiment of our invention. It comprises the combination with a silver recovery unit 18 and a film developing unit 32, of a holding basin or tank 12. The tank is provided with an outlet opening 14 to which is connected conduit 16. The other end of conduit 16 is connected to an electrolytic silver recovery unit 18 which is part of the prior art and commercially available. Conduit 16 discharges the solution from tank 12 to silver recovery unit 18. Also provided in tank 12 is switch device 20 which is activated to close an electric circuit by means of float member 22 linked to switch device 20 by means of arm 24. Switch device 22 closes an electric circuit to operate electric solenoid valve 26 provided in conduit 16 which serves to open or close the flow of solution through conduit 16. Also provided in conduit 16 is flow control valve 28, the orifice of which is adjustable to control the rate of flow of solution through conduit 16. A second conduit 30 is connected to a film developing processor 32 to receive the fixer overflow. The solution from film processor 32 is discharged at the other end of conduit 30 into tank 12. I prefer to provide holding tank 12 with baffle partition 34 which allows an emergency overflow of the solution to be discharged in auxiliary tank 12' and which may be recovered through closed drain 36. The overflow to auxiliary tank 12' may result when the rate of overflow of the solution from the film processor 32 is at a greater rate than the discharge of the solution from tank 12. Any solution recovered from auxiliary tank 12' through drain 36 may be manually returned to tank 12 when the necessary adjustment to equalize the flow of the solution into tank 12 with the flow of the solution out of tank 12 is made.

Figure 2:
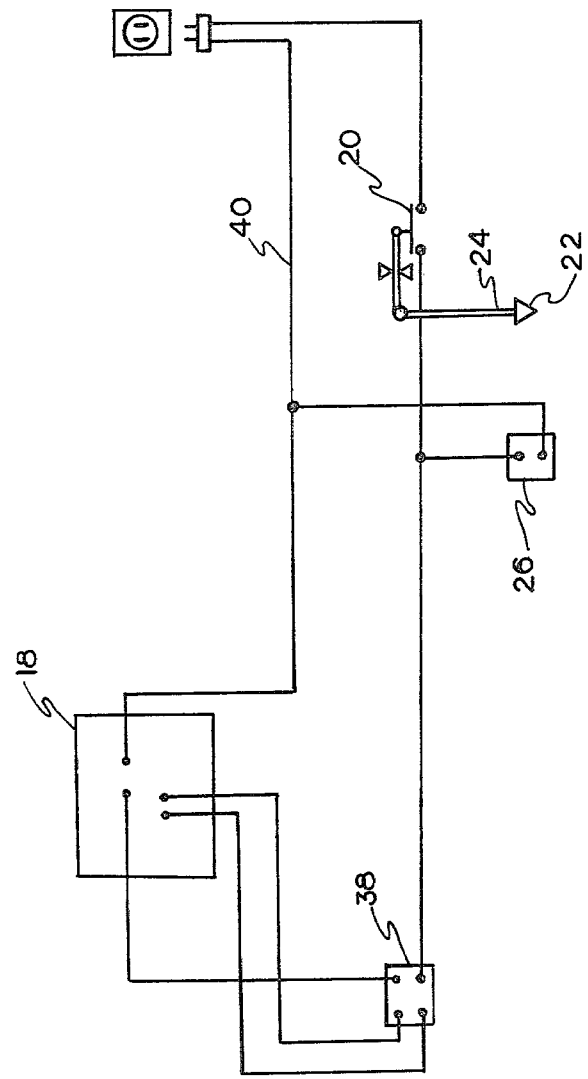
FIG. 2 is a schematic diagram of the electric circuit of our invention.

With reference now to FIG. 2 of the drawings, the electric circuit of our invention includes the circuit of solenoid valve 26 and the electric circuit of switch device 20 actuated by float member 22 in the power circuit of silver recovery unit 18. FIG. 2 is a simple diagramatic circuit of this invention showing the power line feed to silver recovery unit 18 through DC relay 38 which provides the DC current for the plating process. Provided in the power feed circuit 40 is float actuated switch 20 which controls current to silver recovery unit 18 and the operation of solenoid operated valve 26.

In the operation of this invention, the operation of film developing unit 32 and silver recovery unit 18 is combined with an interposed holding tank 12 which receives the silver laden solution discharged from film processing unit 32. When the silver laden solution in holding tank 12 is at a level therein whereby float activated switch 20 is open, power circuit 40 to the silver recovery unit 18 is interrupted and the silver recovery unit 18 is not in operation. Also, solenoid operated valve 26 is closed preventing gravity flow of the silver solution to flow to drain 42 through silver recovery unit 18. When the film processor unit is put in operation, the silver laden solution will flow from the fixer overflow through conduit 30 into holding tank 12. Float member 22 will rise with the level of the silver solution in holding tank 12 and at a preselect level, float member 22 will close switch device 20, thereby closing AC power circuit 40 to silver recovery unit 18. The closing of float actuated switch 20 will activate the AC and DC components of the silver recovery unit 18 thereby putting it into operation. Also, solenoid operated valve 26 will open allowing flow through conduit 16 to the silver recovery unit. Flow control valve 28 in conduit 16 is preset to allow a measured flow rate which is determined to be the proper flow for a given current plate charge which is preset on the silver recovery unit. Also determined as a given quantity is the silver concentration of the solution contained in holding tank 12. We have found that by providing a holding tank 12 to operate in combination with a film processor 32 and a silver recovery unit 18, the concentration of silver in the solution accumulated in holding tank 12 became a more stable average than the direct flow from the film processor to the silver recovery unit as it was in the prior art.

The reservoir of solution allows a more uniform flow rate of solution of a given silver concentration which is less varying for the given plating charge on the recovery unit, enabling a greater approach to optimum silver recovery both in terms of quality and quantity. When the operator of the film processing unit 32 stops the film developing process, the flow of silver laden solution to holding tank 12 stops. Continued operation of silver recovery unit 18 will lower the level of the silver solution in holding tank 12. This causes float member 22 to drop, opening switch 20 interrupting AC power circuit 40 thereby deenergizing the AC and DC electric components of silver recovery unit 18, and the circuit of solenoid of valve 26 thereby closing valve 26 and stopping the flow of solution when recovery unit 18 is not in operation preventing flow of solution to drain 42 with the consequent waste of silver.

Though this invention is described as including valves 26 and 28 in conduit 16, it is possible to combine the operational characteristics of each of these valves in one valve. Thus, solenoid operated valve 26 may have an adjustable orifice allowing a metered flow of solution therethrough when open, and may be made to close completely when required for purposes of our invention.

We claim:

1. The combination of a holding tank for accumulating photographic developing solution and an electrolytic silver recovery apparatus, wherein the improvement comprises:
   a conduit means between said holding tank and said silver recovery apparatus;
   a first valve means in said conduit means for controlling the rate of flow therethrough;
   a second valve means in said conduit means for interrupting flow of solution therethrough;
   an electric circuit for operating said electrolytic silver recovery apparatus and said second valve means in said conduit means;
   switch means in said electric circuit; and
   a means in said holding tank for actuating said switch means to open and close said circuit.

2. The combination of claim 1 wherein said valve means is further characterized as being adjustable for selectively controlling the rate of flow of solution through said conduit means.

3. The combination of claim 1 wherein said means for actuating said switch means to open and close said circuit is further characterized as being responsive to the quantity of solution in said holding tank.

4. The combination of claim 3 wherein said means for actuating said switch means is further characterized as including a float member in said holding tank moveable to actuate said switch means by the level of solution in said holding tank.

5. In an apparatus for recovering silver from photographic developing solution wherein said solution is delivered from a photographic film developing unit to an electrolytic silver recovery unit, the combination therewith of:
   a holding tank;
   conduit means between said film developing unit and said holding tank for conveying said photographic solution discharge from said photographic film developing unit to said holding tank;
   a second conduit means between said holding tank and said silver recovery unit;

a flow control valve in said second conduit means for controlling the rate of flow therethrough;

a solenoid operated valve in said second conduit means for interrupting flow of solution therethrough;

an electric power circuit for operating said electrolytic silver recovery unit and said solenoid valve in said second conduit means;

switch means in said electric power circuit; and float means in said holding tank for actuating said switch means to open and close said power circuit, said float means being responsive to the quantity of solution in said holding tank.

* * * * *